US012049089B2

(12) United States Patent
Butinya Teixido et al.

(10) Patent No.: US 12,049,089 B2
(45) Date of Patent: Jul. 30, 2024

(54) PRINTING FLUID CIRCULATION

(71) Applicant: Hewlett-Packard Development Company, L.P., Spring, TX (US)

(72) Inventors: David Butinya Teixido, Sant Cugat del Valles (ES); Albert Crespi Serrano, Sant Cugat del Valles (ES); Marta Coma Vives, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/067,143

(22) Filed: Dec. 16, 2022

(65) Prior Publication Data

US 2023/0123332 A1 Apr. 20, 2023

Related U.S. Application Data

(63) Continuation of application No. 17/052,094, filed as application No. PCT/US2018/046525 on Aug. 13, 2018, now Pat. No. 11,541,667.

(51) Int. Cl.
*B41J 2/18* (2006.01)

(52) U.S. Cl.
CPC .................................... *B41J 2/18* (2013.01)

(58) Field of Classification Search
CPC . B41J 2/18; B41J 2/17566; B41J 2/175; B41J 2/17556; B41J 2/19
See application file for complete search history.

(56) References Cited

U.S. PATENT DOCUMENTS

| | | | |
|---|---|---|---|
| 7,416,293 | B2 | 8/2008 | Langford et al. |
| 7,497,562 | B2 | 3/2009 | Childs et al. |
| 7,815,296 | B2 | 10/2010 | Kawamura |
| 7,828,425 | B2 | 11/2010 | Kang et al. |
| 8,444,259 | B2 | 5/2013 | Bennett |
| 8,465,133 | B2 | 6/2013 | Park et al. |
| 8,474,930 | B2 | 7/2013 | Rasmussen |

(Continued)

FOREIGN PATENT DOCUMENTS

| | | | |
|---|---|---|---|
| CN | 1621234 | A | 6/2005 |
| RU | 2612934 | C2 | 3/2017 |

(Continued)

OTHER PUBLICATIONS

International Search Report and Written Opinion dated May 7, 2019, PCT Patent Application No. PCT/US2018/046525, filed Aug. 13, 2018, Federal Institute of Industrial Property, Moscow, Russia, 7 pages.

*Primary Examiner* — Justin Seo
*Assistant Examiner* — Tracey M McMillion
(74) *Attorney, Agent, or Firm* — Jordan IP Law, LLC

(57) ABSTRACT

An example printing fluid circulation system includes a first circuit to circulate a printing fluid through a printhead in a first direction and a second circuit to circulate the printing fluid through the printhead in a second direction opposite to the first direction. The first circuit is activated during a first mode to circulate the printing fluid from a first reservoir to a second reservoir. The second circuit is activated during a second mode different from the first mode to circulate the printing fluid from the first reservoir to the second reservoir.

20 Claims, 6 Drawing Sheets

(56) References Cited

U.S. PATENT DOCUMENTS

| | | | |
|---|---|---|---|
| 9,403,371 | B2 | 8/2016 | Koike et al. |
| 10,040,293 | B2 | 8/2018 | Nakamura et al. |
| 2009/0058956 | A1 | 3/2009 | Davis et al. |
| 2009/0244226 | A1 * | 10/2009 | Hoshino .............. B41J 2/17509 347/92 |
| 2017/0197409 | A1 | 7/2017 | Okushima et al. |
| 2017/0320331 | A1 | 11/2017 | Alessi et al. |
| 2018/0154647 | A1 * | 6/2018 | Coma Vives ............ B41J 2/175 |

FOREIGN PATENT DOCUMENTS

| | | | |
|---|---|---|---|
| WO | 2012/115654 | A1 | 8/2012 |
| WO | 2017/000997 | A1 | 1/2017 |
| WO | 2018/139986 | A1 | 8/2018 |

* cited by examiner

PRINTING FLUID CIRCULATION

BACKGROUND

Some printing systems have a reservoir to store printing fluid, such as ink, and a printing fluid circulation circuit to supply the printing fluid from the reservoir to a printhead, to enable the printhead to apply the printing fluid to a substrate to form an image on the substrate during a print job.

BRIEF DESCRIPTION OF DRAWINGS

Examples will now be described, by way of non-limiting example, with reference to the accompanying drawings, in which.

DETAILED DESCRIPTION

In some printing systems, air can get trapped in the fluid circuit of a printhead. Air in printing fluid systems may cause problems for printing system components such as pressure sensors or flowmeters. For example, printheads may include filters to trap the air within the fluid circuit and, as a consequence of air presence, may need to be replaced more frequently For example, air bubbles in printing fluid systems may affect sensor measurements which may lead to false detections (for example a false detection of an ink cartridge being out of ink, or a false detection of an end of a refill of an ink cartridge).

In some examples set out below there is provided a printing system including a fluid circulation circuit, or a method of operating a printing system. Certain examples enable printing fluid to be circulated, or recirculated, in a printing system. Certain examples enable printing fluid to be circulated, or recirculated, in two directions of a printing system. For example, certain examples enable printing fluid to be recirculated through a printhead. In some examples, printing fluid may be recirculated through a printhead in two directions, e.g. two opposite directions such as, from a reservoir of printing fluid towards a fluid circuit and from the fluid circuit to the reservoir. Bi-directionally recirculating printhead fluid through a printhead may make reduce the instances of air being trapped in one or more filters of the printhead, and air may be moved out of the printhead and to a print cartridge whereby the trapped air may be removed from a printing system when replacing the cartridge.

Figure 1:
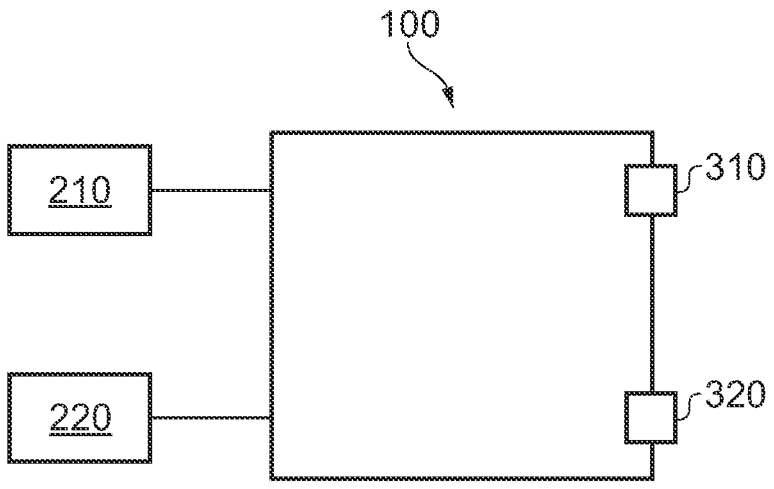
FIG. 1 is a simplified schematic diagram of an example printing fluid circulation system.

FIG. 1 shows schematically part of a printing system including a printing fluid circulation circuit 100. The printing circuit 100 of this example comprises a first reservoir 210 to store printing fluid and a second reservoir 220 to store printing fluid. The printing system of this example also comprises a printing fluid circulation circuit 100. The printing fluid circulation circuit 100 of this example comprises a first circuit port 310 to supply printing fluid to, or to receive printing fluid from, a first fluid port of a printhead, and a second circuit port 320 to supply printing fluid to, or receiving printing fluid from, a second fluid port of a printhead. The printing fluid circulation circuit 100 is to operate in a first mode to concurrently supply printing fluid from the first reservoir 210 to the first circuit port 310 and from the second circuit port 320 to a second reservoir 220, and in a second mode to concurrently supply printing fluid from the first reservoir 210 to the second circuit port 320 and from the first circuit port 310 to the second reservoir 220.

Each of the first and second fluid ports of the printhead may comprise a needle.

In one example, the first reservoir 210 may comprise a first reservoir fluid port through which printing fluid may pass between the first reservoir 210 and the printing fluid circulation circuit 100. In this example the first reservoir 210 is fluidly connected to the printing fluid circulation circuit 100 by the first reservoir fluid port. Therefore, in this example, printing fluid to pass from the first reservoir 210 to the printing fluid circulation circuit 100 passes through the first reservoir fluid port. In one example, the second reservoir 220 may comprise a second reservoir fluid port through which printing fluid may pass between the printing fluid circulation circuit 100 and the second reservoir 220. In this example the second reservoir 220 is fluidly connected to the printing fluid circulation circuit 100 by the second reservoir fluid port. Therefore, in this example, printing fluid to pass from the printing fluid circulation circuit 100 to the second reservoir 220 passes through the second reservoir fluid port. In this example, the printing fluid circulation circuit 100 may be to operate in a first mode to concurrently supply printing fluid from the first reservoir 210 through the first reservoir fluid port to the first circuit port 310 and from the second circuit port 320 to a second reservoir 220 through the second reservoir fluid port, and in a second mode to concurrently supply printing fluid from the first reservoir 210 through the first reservoir fluid port to the second circuit port 320 and from the first circuit port 310 to the second reservoir 220 through the second reservoir fluid port.

In one example, one, or both, of the first and second circuit ports 310, 320, are comprised in the supply system. Accordingly, in this example, the printing fluid circulation circuit 100 comprises a printing fluid circulation circuit 100, and the printing fluid circulation circuit 100 comprises the first circuit port 310 to supply printing fluid to, or to receive printing fluid from, a first fluid port of a printhead, and the second circuit port 320 to supply printing fluid to, or receiving printing fluid from, a second fluid port of a printhead.

Accordingly, when the printing fluid circulation circuit operates in the first mode, printing fluid may be circulated in a first direction, from the first reservoir 210 to a first fluid port of a printhead, via the first circuit port, and out of a second fluid port of the printhead to the second reservoir 220, via the second circuit port. When the printing fluid circulation circuit operates in the second mode, printing fluid may be circulated in a second direction (e.g. opposite the first), from the first reservoir 210 to the second fluid port of the printhead, via the second circuit port, and out of the first fluid port of the printhead to the second reservoir 220, via the first circuit port. Therefore, in some examples, printing fluid circulates from the first reservoir 210 to the second reservoir 220 when the printing fluid circulation circuit is operating in either mode. Printing fluid may be routed into the first circuit port (and therefore the first fluid port of the printhead) and out of the second circuit port (and therefore the second fluid port of the printhead) when the printing fluid circulation circuit is operating in its first mode of operation. When the printing fluid circulation circuit is operating in its second mode of operation, printing fluid may be routed into the second circuit port (and therefore the second fluid port of the printhead) and out of the first circuit port (and therefore the first fluid port of the printhead).

Accordingly, certain examples enable printing fluid to be circulated in one of two directions into, through, and out of a printhead. Accordingly, in certain examples, bi-directional recirculation of printing fluid is enabled.

Figure 2:
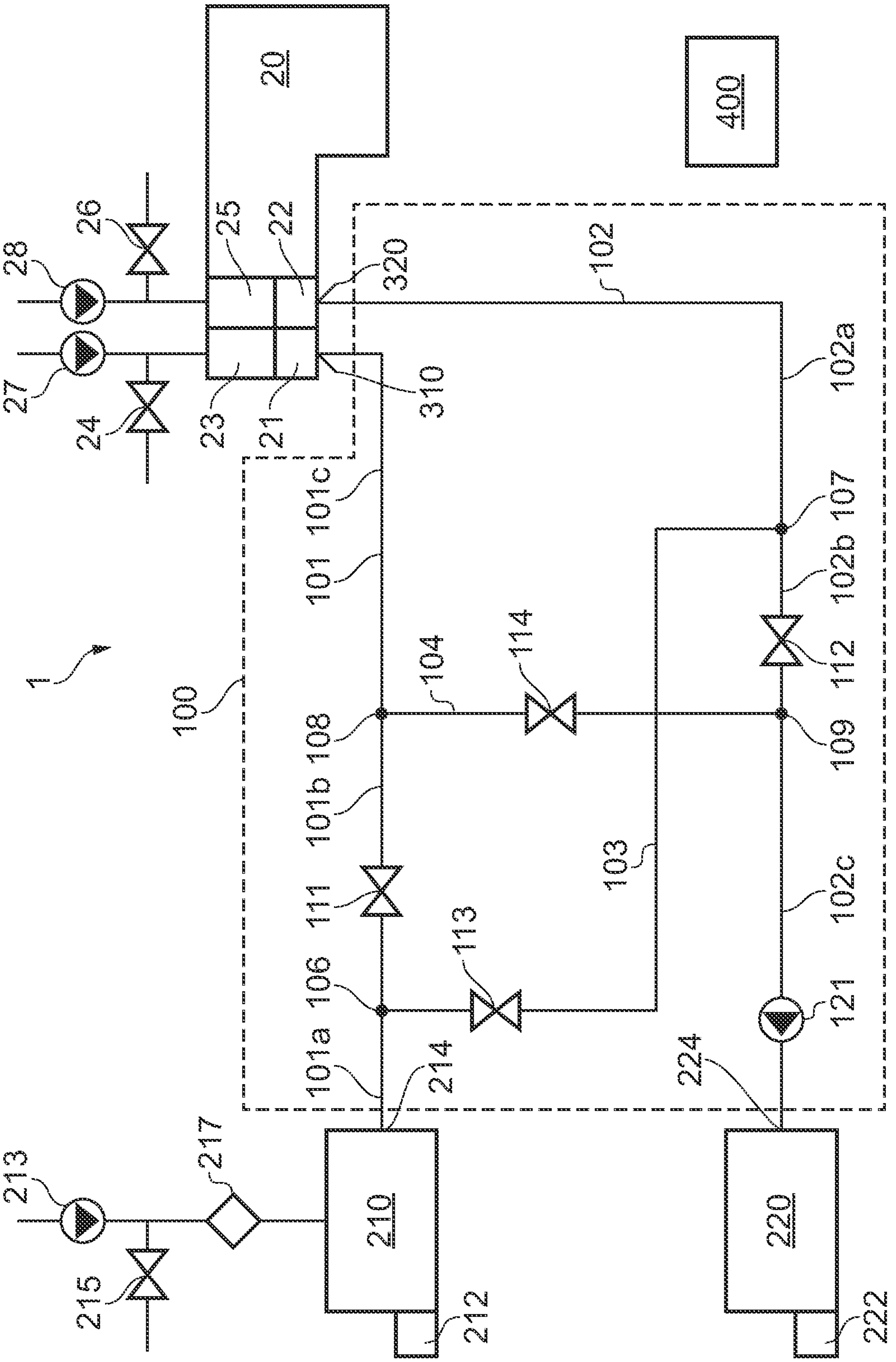
FIG. 2 is a simplified schematic diagram of an example printing system, which comprises an example printing fluid circulation system.

FIG. 2 shows schematically and example printing system 1. The printing system 1 of this example comprises an example printing fluid circulation circuit 100, and a printhead 20. The printing circuit 100 of this example also comprises a first reservoir 210 and a second reservoir 220. The printhead 20 comprises a nozzle to apply printing fluid to a substrate, such as paper.

The first and second reservoirs 210, 220 may take any form to store printing fluid. For example, the first or second reservoirs 210, 220 may be a tank or other receptacle. The first or second reservoirs 210, 220 may be closed or open to the atmosphere. The second reservoir 220 may be comprised in an ink, or printer, cartridge. The second reservoir 220 may be comprised in an ink, or printer, cartridge along with a third reservoir. That is, an ink cartridge may comprise the second reservoir 220 and a third reservoir.

The printing fluid circulation circuit 100 of this example comprises a first pump 213. The first pump 213 is to pump air into the first reservoir 210 to pressurise any ink contained therein. Therefore, in one example, the first pump 213 may comprise an air pressure pump. Pumping pressurised air into the first reservoir 210, via the first pump 213, may pressurise air in the first reservoir 210 which may pressurise any ink in the first reservoir 210. Therefore, the first pump 213 may be to pressurise the first reservoir. For example, the first pump 213 may be to pressurise ink in the first reservoir.

The printing fluid circulation circuit 100 of this example comprises a seventh valve 215 and a sensor 217. The seventh valve 215 may be to connect the first reservoir 210 to the atmosphere. For example, the seventh valve 215 may be to depressurise the first reservoir 210. The sensor 217 may be to sense the pressure in the first reservoir 210. Therefore, in one example the sensor 217 may be a pressure sensor. In another example the sensor 217 may be to compare the pressure between a first side of the reservoir and a second side of the reservoir. For an example, the sensor 217 may be to sense the pressure at an ink discharge side of the first reservoir and to sense the pressure at an air intake side of the first reservoir, and to compare the pressures. Accordingly, in one example, the sensor 217 may be a differential pressure sensor.

The printing fluid circulation circuit 100 in the example of FIG. 2 comprises a first circuit port 310 and a second circuit port 320. The first circuit port 310 is to supply printing fluid to, or receive printing fluid from, a first fluid port 21 of the printhead 20. The second circuit port 320 is to supply printing fluid to, or receive printing fluid from, a second fluid port 22 of the printhead 20. Therefore, in this example, the first and second circuit ports 310, 320 are to supply printing fluid to, or receive printing fluid from, the printhead 20. In this example, the first circuit port 310 is fluidly connected to the first fluid port 21 of the printhead 20 and the second circuit port 320 is fluidly connected to the second fluid port 22 of the printhead 20. The first or second fluid ports 21, 22 may, in one example, be a needle.

In this example, printing fluid (such as liquid ink) may be supplied to either one of the first and second fluid ports 21, 22 of the printhead 20 from the first reservoir 210, and recirculated to the second reservoir 220 via the other of the first and second fluid ports 21, 22 of the printhead 20. Accordingly, in this example, printing fluid from the first reservoir may be supplied into and through the printhead 20 in one of two directions (e.g. into the first fluid port 21 and out of the second fluid port 22; of into the second fluid port 22 and out of the first fluid port 21), depending on the mode of operation of the printing fluid circulation circuit 100.

The printing fluid circulation circuit 100 of the example of FIG. 2 is to operate in a first mode and a second mode. In the first mode, the printing fluid circulation circuit 100 is to concurrently supply printing fluid from the first reservoir 210 to the first circuit port 310 and from the second circuit port 320 to the second reservoir 220. In the second mode, the printing fluid circulation circuit 100 is to concurrently supply printing fluid from the first reservoir 210 to the second circuit port 320 and from the first circuit port 310 to the second reservoir 220. Accordingly, in both modes of operation the printing fluid circulation circuit 100 is to supply printing fluid from the first reservoir 210. For example, in both modes of operation the printing fluid circulation circuit 100 is to circulate fluid from the first reservoir 210, into and through the printhead 20 (in one of two directions determined by the specific mode of operation) and out of the printhead 20 to the second reservoir 220. The mode of operation determines which one of the first and second circuit ports 310, 320 printing fluid from the first reservoir 210 is supplied to, and from which one of the first and second circuit ports 310, 320 printing fluid is supplied to the second reservoir 220. Therefore, when the first circuit port 310 is connected to the first fluid port 21 of the printhead 20, and when the second circuit port 320 is connected to the second fluid port 22 of the printhead 20, in the first mode of operation of the printing fluid circulation circuit 100, printing fluid may be fed from the first reservoir 210 and into the printhead 20 via the first circuit port 310, and may pass through the printhead 20 and then out of the printhead 20 and into the printing fluid circulation circuit 100 via the second circuit port 320 and then return to the second reservoir 220. Additionally, when the first circuit port 310 is connected to the first fluid port 21 of the printhead 20, and when the second circuit port 320 is connected to the second fluid port 22 of the printhead 20, in the second mode of operation of the printing fluid circulation circuit 100, printing fluid may be fed from the first reservoir 210 and into the printhead 20 via the second circuit port 320, and may pass through the printhead 20 and then out of the printhead 20 and into the printing fluid circulation circuit 100 via the first circuit port 310 and then return to the second reservoir 220.

Accordingly, in this example, when the first circuit port 310 is connected to the first fluid port 21 of the printhead 20, and when the second circuit port 320 is connected to the second fluid port 22 of the printhead 20, in the first mode, the printing fluid circulation circuit 100 is to concurrently supply printing fluid from the first reservoir 210 to the first fluid port 21 of the printhead 20 and from the second fluid port 22 of the printhead 20 to the second reservoir 220, and, in the second mode, the printing fluid circulation circuit 100 is to concurrently supply printing fluid from the first reservoir 210 to the second fluid port 22 of the printhead 20 and from the first fluid port 21 of the printhead 20 to the second reservoir 220.

The printing fluid circulation circuit 100 comprises a controller 400. The controller 400 may be to determine which of the first and second modes the printing fluid circulation circuit is to operate. The controller 400 may comprise, for example, an integrated circuit or a microprocessor. The controller 400 may be communicatively connected to the printing fluid circulation circuit 100 and/or the printing fluid circulation system 10. The controller 400 may be to cause the printing fluid circulation circuit 100 to operate in either of the first and second modes. In one example, the controller 400 may be to cause the printing fluid circulation circuit 100 to operate in either of the first and second modes after a predetermined time period has elapsed, e.g. after the printing fluid circulation circuit 100 has been idle for a predetermined period of time (e.g. after a timeout). In one example, the controller 400 may be to cause the printing fluid circulation circuit 100 to operate in either of the first and second modes, and may be to cause the printing fluid circulation circuit 100 to operate in the other of the first and second modes after a predetermined period of time has elapsed. The controller 400 therefore, in one example, may be to cause the printing fluid circulation circuit 100 to switch between its first and second modes, e.g. to switch between operating in its first and second modes.

The printing fluid circulation circuit 100 will now be described in more detail. In the example of FIG. 2, the printing fluid circulation circuit comprises first to fourth flow paths, 101, 102, 103, and 104, respectively. The first flow path 101 extends between the first reservoir 210 and the first circuit port 310. The first flow path 101 may fluidly connect the first reservoir 210 and the first circuit port 310. The second flow path 102 extends between the second circuit port 320 and the second reservoir 220. The second flow path 102 may fluidly connect the second circuit port 320 to the second reservoir 220. The third flow path 103 extends between a first point 106 on the first flow path 101 to a second point 107 on the second flow path 102. The third flow path 103 may fluidly connect the first and second points 106, 107. The fourth flow path 104 extends between a third point 108 on the first flow path 101 and a fourth point 109 on the second flow path 102. The fourth flow path may fluidly connect the third and fourth points 108, 109. In this example, the third point 108 is between the first point 106 and the first circuit port 310 and the fourth point 109 is between the second point 107 and the second reservoir 220.

In the example of FIG. 2, the printing fluid circulation circuit 100 comprises first to fourth valves 111, 112, 113, and 114, respectively. In this example, the first valve 111 is to selectively block the flow path 101 at a point between the first and third points 106, 108 on the first flow path 101, the second valve 112 is to selectively block the second flow path 102 at a point between the second and fourth points 107, 109 on the second flow path 102. In this example, the third valve 113 is to block is to selectively block the third flow path 103 at a point between the first and second points 106, 107, and the fourth valve 114 is to selectively block the fourth flow path 104 at a point between the third and fourth points 108, 109.

The first and third points 106, 108, on the first flow path 101 may subdivide the first flow path 101 as follows. The first flow path 101 may comprise first to third sub-paths 101*a*, 101*b*, and 101*c*, respectively. The first sub-path 101*a* extends between the first reservoir 210 and the first point 106, and in one example may fluidly connect the first reservoir 210 and the first point 106. The second sub-path 101*b* extends between the first point 106 and the third point 108, and in one example may therefore fluidly connect the first point 106 and the third point 108. The first valve 111 is therefore disposed on the second sub-path 101*b*. The third sub-path 101*c* extends between the third point 108 and the first circuit port 310, and in one example may fluidly connect the third point 108 and the first circuit port 310. Similarly, the second and fourth points 107, 109 on the second flow path may subdivide the second flow path 102 as follows. The second flow path 102 may comprise fourth to sixth sub-paths 102*a*, 102*b*, and 102*c*, respectively. The fourth sub-path 102*a* extends between the second circuit port 320 and the second point 107, and in one example may fluidly connect the second circuit port 320 and the second point 107. The fifth sub-path 102*b* extends between the second point 107 and the fourth point 109, and in one example may therefore fluidly connect the second point 107 and the fourth point 109. The second valve 112 is therefore disposed on the fifth sub-path 102*b*. The sixth sub-path 102*c* extends between the fourth point 109 and the second reservoir 220, and in one example may fluidly connect the fourth point 109 and the second reservoir 220.

The controller 400, in this example, is to control a state of each of the first to fourth valves 111-114. The controller 400 may be to control a state of each of the first to fourth valves 111-114 to control the direction of fluid flow through the printing fluid circulation circuit 100. The controller 400 may be communicatively connected to the valves 111-114. In this example, the controller 400 is to cause the first and second valves 111, 112 to be open and the third and fourth valves 113, 114 to be closed when the printing fluid circulation circuit 100 is operating in the first mode. In this example, the controller 400 is to cause the first and second valves to be closed and the third and fourth valves 113, 114 to be open when the printing fluid circulation circuit 100 is operating in the second mode.

In some examples the first to fourth valves 111-114 may be electrovalves, or, in another example, the valves 111-114 may be solenoid valves or any other type of valve. In one example, the first to fourth valves 111-114 may be solenoid valves.

The printing fluid circulation circuit 100 of this example comprises a second pump 121. The second pump 121 is between the fourth point 109 and the second reservoir 220. The second pump 121 is fluidly connected between the fourth point 109 and the second reservoir 220. The second pump 121 is disposed on the second flow path 102. The second pump 121 is disposed on the sixth sub-path 102*c*. The second pump 121 may be to pump printing fluid from the fourth point 109 to the second reservoir 220. The second pump 121 may be to pump printing fluid from the fourth point 109 to the second reservoir 220 when the printing fluid circulation circuit 100 is operating in either the first mode or the second mode. In this example, the second pump 121 is to draw printing fluid from the fourth flow path 104 or the fifth sub-path 102*b*, depending on the mode of the printing fluid circulation circuit 100.

The second pump 121 may therefore be to create negative, suction, pressure in the fourth flow path, from the fourth point 109.

In this example, the first reservoir 210 has a first fluid port 214, through which printing fluid may pass between the first reservoir 210 and the printing fluid circulation circuit 100. In this example, the first reservoir 210 is fluidly connected to the printing fluid circulation circuit 100 just by the first fluid port 214. Therefore, in this example printing fluid to pass from the first reservoir 210 to the printing fluid circulation circuit 100 has to pass through the first fluid port 214. In this example, the second reservoir 220 has a second fluid port 224, through which printing fluid may pass between the printing fluid circulation circuit 100 and the second reservoir 220. In this example, the second reservoir 220 is fluidly connected to the printing fluid circulation circuit 100 just by the second fluid port 224. Therefore, in this example printing fluid to pass from the the printing fluid circulation circuit 100 to the second reservoir 220, has to pass through the second fluid port 224. In this example, in either the first or second mode, the printing fluid circulation circuit 100 is to concurrently supply printing fluid from the first reservoir 210 through the first fluid port 214 and to the second reservoir 220 through the second fluid port 224. Accordingly, in this example, the each fluid port 214, 224 may be one-directional fluid ports. For example, the first fluid port 214 may be to allow fluid to flow from the reservoir 210 to the printing fluid circulation circuit 100 and the second fluid port 224 may be to allow fluid to flow from the printing fluid circulation circuit 100 to the second reservoir 220.

The printing fluid circulation circuit 100 of this example also comprises a first detector 212 to detect a volume of printing fluid contained in the first reservoir 210, and a second detector 222 to detect a volume of printing fluid contained in the second reservoir 220. Each of the first and second detectors 212, 222 in this example may take any form suitable to sense how much printing fluid, such as ink, there is present in the respective reservoir 210, 220. Each of the first and second detectors 212, 222 in this example may take any form suitable to sense when there is less than a certain predetermined volume of printing fluid, such as ink, present in the respective reservoir 210, 220. Each of the first and second detectors 212, 222 may, for example, comprise a float that is to move with a level of liquid in the respective reservoir 210, 220, and a switch that is to actuate when the float sinks in the reservoir to below a predetermined position to indicate the volume of liquid in the respective reservoir 210, 220. The first reservoir 210 may be refilled with printing fluid (from either the second reservoir 220 or a third reservoir) when the volume of liquid is below a predetermined level. Other forms of detector 212, 222 may instead be provided in other examples. In some examples, the first detector 212 and/or the second detector 222 may be omitted.

The controller 400 may be communicatively connected to the detectors 212, 222. The controller 400 may determine the volume(s), or level(s), of printing fluid in the reservoirs 210, 220 on the basis of signal(s) output from the detector(s) 212, 222. In some examples, the controller 400 may be to determine whether to fill the first reservoir 210 based on the level of fluid, or the volume of fluid, in the first reservoir 210. For example, if the volume of liquid in the first reservoir is less than a predetermined level, the controller 400 may be to cause a system (e.g. the printing fluid circulation circuit 100) to supply ink to the first reservoir 210. In one example, if the volume of liquid in the first reservoir is less than a predetermined level, the controller 400 may be to cause the second reservoir 220 to supply ink to the first reservoir 210.

In use, the second pump 121 is operating to pump printing fluid from the fourth point 109 to the second reservoir, whether the printing fluid circulation circuit is operating in the first or the second mode. Also, in use, the first reservoir 210 is pressurised (e.g. by the first pump 213). As the first reservoir 210 contains pressurised printing fluid, this may cause a pressure differential between the interior of the first reservoir 210 and the exterior of the first reservoir 210 (e.g. in the first sub-path 101*a*, and/or exterior to the first reservoir fluid port 214). This may ensure that, in use, the first reservoir 210 expels, e.g. pumps, printing fluid from the first reservoir 210 to the first point 106, whether the printing fluid circulation circuit is operating in the first or the second mode. Therefore, in one example, printing fluid is flowing from the first reservoir 210 to the first point 106, and from the fourth point 109 to the second reservoir 220, whether the printing fluid circulation circuit is operating in the first or the second mode.

When the printing fluid circulation circuit 100 is operating in the first mode, each of the first and second valves 111, 112 is open, and each of the third and fourth valves 113, 114 is closed. In this example, a printing fluid flow path is opened from the first reservoir 210 to the first circuit port 310 via the first flow path 101, and a printing fluid flow path is opened from the second circuit port 320 to the second reservoir 220 via the second flow path 102. Therefore, in use, when the printing fluid circulation circuit is operating in the first mode, (pressurised) printing fluid flows from the first reservoir 210 to the first circuit port 310 (via the first flow path 101), and (when the first circuit port 310 is connected to the first fluid port 21 of the printhead 20) into the printhead 20 via the first fluid port 21. Thereafter, printing fluid flows out of the printhead 20 via the second fluid port 22 and (when the second circuit port 320 is connected to the second fluid port 22 of the printhead 20) to the second reservoir 220 (via the second flow path 102).

When the printing fluid circulation circuit 100 is operating in the first mode, the second pump 121 is therefore to provide a negative, suction, pressure to the second circuit port 320 (and therefore to the second fluid port 22 when this port is fluidly connected to the port 320) via the second flow path 102. The pressure provided by the second pump 121 may aid in drawing fluid from the second circuit port 320 and the second fluid port 22.

When the printing fluid circulation circuit 100 is operating in the second mode, each of the first and second valves 111, 112 is closed, and each of the third and fourth valves 113, 114 is open. In this example, a printing fluid flow path is opened from the first reservoir 210 to the second circuit port 320 via the first sub-path path 101*a*, the third flow path 103, and the fourth sub-path 102*a*, and a printing fluid flow path is opened from the first circuit port 310 to the second reservoir 220 via the third sub-path 101*c*, the fourth flow path 104, and the sixth sub-path 102*c*. Therefore, in use, when the printing fluid circulation circuit is operating in the second mode, (pressurised) printing fluid flows from the first reservoir 210 to the second circuit port 320 (via the first sub-path path 101*a*, the third flow path 103, and the fourth sub-path 102*a*), and (when the first circuit port 320 is connected to the second fluid port 22 of the printhead 20) into the printhead 20 via the second fluid port 22. Thereafter, printing fluid flows out of the printhead 20 via the first fluid port 21 and (when the first circuit port 310 is connected to the first fluid port 12 of the printhead 20) to the second reservoir 220 (via the third sub-path 101*c*, the fourth flow path 104, and the sixth sub-path 102*c*).

When the printing fluid circulation circuit 100 is operating in the second mode, the second pump 121 is therefore to provide a negative, suction, pressure to the first circuit port 310 (and therefore to the first fluid port 21 when this port is fluidly connected to the port 310) via the third sub-path 101*c*, fourth flow path 104, and sixth sub-path 102*c*. The pressure provided by the second pump 121 may aid in drawing fluid from the first circuit port 310 and the first fluid port 21.

Therefore, printing fluid may flow in one direction through the first sub-path 101*a*, and the sixth sub-path 102*c* in both the first and second modes, printing fluid may flow in either direction through third and fourth sub-paths 101*c*, 102*a* in both the first and second modes. In the first mode there is no flow through the third or fourth flow paths 103,

104 due to the closure of the third and fourth valves 113, 114. In the second mode there is no flow through the second and fourth sub-paths 101*b*, 102*b*.

Therefore, in the example of FIG. 2, printing fluid from the first reservoir 210 may be circulated through the printhead 20 in one of two directions—either into the printhead 20 through the first fluid port 21 and out of the printhead 20 through the second fluid port 22, or into the printhead 20 through the second fluid port 22 and out of the printhead 20 through the first fluid port 21.

In the example of FIG. 2, the printhead 20 comprises a first printhead regulator 23 and a second printhead regulator 25. The first printhead regulator 23 in this example is operatively connected, or coupled, to the first fluid port 21 of the printhead 20 and the second printhead regulator 25 in this example is operatively connected to the second fluid port 22.

The first regulator 23 in this example is fluidly connected to the atmosphere by a first regulator valve 24. The regulator 23 comprises a regulator bag which, when the first regulator valve 24 is in an open state, is fluidly connected to the atmosphere and therefore is at atmospheric pressure when the first regulator valve 24 is open. A first regulator pump 27 is fluidly connected to the first regulator 23. The first regulator 23 may be opened by the first regulator valve 24 being closed and by the first regulator pump 27 blowing air into a bag of the first regulator 23. Opening of the first regulator 23 causes the first fluid port 21 to be opened. The second regulator 25 in this example is fluidly connected to the atmosphere by a second regulator valve 26. The second regulator 25 comprises a regulator bag which, when the second regulator valve 26 is in an open state, is fluidly connected to the atmosphere and therefore is at atmospheric pressure when the second regulator valve 26 is open. A second regulator pump 28 is fluidly connected to the second regulator 25. The second regulator 25 may be opened by the second regulator valve 26 being closed and by the second regulator pump 28 blowing air into a bag of the second regulator 25. Opening of the second regulator 25 causes the second fluid port 22 to be opened.

In one example, the first regulator valve 24 and/or second regulator valve 26 and/or the first regulator pump 27 and/or the second regulator pump 28 may be part of the printing fluid circulation circuit 100.

In some examples at least one (e.g. both) of the first and second regulator valves 24, 26 may be electrovalves, or, in another example, the regulator valves 24, 26 may be any other type of valve. In one example, the first and second regulator valves 24, 26 may be solenoid valves.

As opening of the first regulator 23 causes the first fluid port 21 to be opened, and opening of the second regulator 25 causes the second fluid port 22 to be opened, in the example of FIG. 2, when the printing fluid circulation circuit 100 is in its first mode and printing fluid is to be supplied to the first circuit port 310 (and therefore to the first fluid port 21 when the first circuit port 310 is fluidly connected to the first fluid port 21), the second regulator 25 may be open so as to open the second fluid port 22, so that the second fluid port 22 can operate as an outlet for the circulated printing fluid. Similarly, when the printing fluid circulation circuit 100 is in its second mode and printing fluid is to be supplied to the second circuit port 320 (and therefore to the second fluid port 22 when the second circuit port 320 is fluidly connected to the second fluid port 22), the first regulator 23 may be open so as to open the first fluid port 21 so that the first fluid port 21 can operate as an outlet for the circulated printing fluid. Therefore, the regulator that corresponds to the fluid port (first fluid port 21 or second fluid pot 22) has a negative, suction, pressure applied to it by the second pump 121 may be opened. For example, if printing fluid is to be moved from the first circuit port 310 to the second circuit port 320 through the printhead 20 (i.e. the printing fluid circulation circuit 100 operating in the first mode) then the second fluid port 22 is a printing fluid outlet and the second regulator 25 may be opened (e.g. under the control of the controller 400). On the other hand, if printing fluid is to be moved from the second circuit port 320 to the first circuit port 310 through the printhead 20 (i.e. the printing fluid circulation circuit 100 operating in the second mode) then the first fluid port 21 is a printing fluid outlet and the first regulator 23 may be opened (e.g. under the control of the controller 400).

In this example, the controller 400 may be communicatively connected to the first and second regulator pumps 27, 28 and to the valves 111-114. In this example, the controller 400 is to cause the second regulator pump 28 to be open, and the first regulator pump 27 to be closed, when the printing fluid circulation circuit 100 is operating in the first mode, and to cause the second regulator pump 28 to be closed, and the first regulator pump 27 to be open, when the printing fluid circulation circuit 100 is operating in its second mode.

The printing fluid circulation circuit 100 of the example of FIG. 2 is also to operate in a third mode. The printing fluid circulation circuit 100 is to operate in the third mode when the printing fluid circulation circuit 100 is to supply printing fluid to the printhead 20 during a print job. Therefore, in this example, the printing fluid circulation circuit 100 is to operate in the third mode when the printing system 1 is performing a print job.

In the third mode, the printing fluid circulation circuit 100 is to concurrently supply printing fluid from the first reservoir 210 to each of the first and second circuit ports 310, 320. Therefore, when the first and second circuit ports 310, 320 are connected to the first and second fluid ports 21, 22, respectively, of the printhead 20, in the third mode the printing fluid circulation circuit 100 is to concurrently supply printing fluid from the first reservoir 210 to each of the first and second fluid ports 21, 22 of the printhead 20.

In this example, and in use, and when the printing fluid circulation circuit 100 is operating in the third mode, each of the first and third valves 111, 113 is open, and each of the second and fourth valves 112, 114 is closed.

In this example, a printing fluid flow path is opened from the first reservoir 210 to the first circuit port 310 via the first flow path 101, and a printing fluid flow path is opened from the first reservoir 210 to the second circuit port 320 via the first sub-path 101*a*, the third flow path 103, and the fourth sub-path 102*a*. Therefore, in use, when the printing fluid circulation circuit is operating in the third mode, (pressurised) printing fluid flows from the first reservoir 210 to the first circuit port 310 (via the first flow path 101), and (when the first circuit port 310 is connected to the first fluid port 21 of the printhead 20) into the printhead 20 via the first fluid port 21; and, concurrently, (pressurised) printing fluid flows from the first reservoir 210 to the second circuit port 320 (via the first sub-path 101*a*, the third flow path 103, and the fourth sub-path 102*a*), and (when the second circuit port 320 is connected to the second fluid port 22 of the printhead 20) into the printhead 20 via the second fluid port 22).

Therefore, in the third mode, the fourth flow path 104, and fifth and sixth sub-paths 102*b*, 102*c* are closed to fluid flow.

The second pump 121 may, in one example, be closed during a print job and hence in the third mode of the printing fluid circulation circuit 100.

In one example each of the first and second printhead regulators 23, 25 may be closed (e.g. each of the first and second regulator pumps 27, 28 may be closed during a print job and hence in the third mode of the printing fluid circulation circuit 100.

In this example, the controller 400 may be communicatively connected to the first and second regulator pumps 27, 28 and to the valves 111-114. In this example, the controller 400 is to cause the first and third valves 111, 113 to be open and the second and fourth valves 112, 114 to be closed when the printing fluid circulation circuit 100 is operating in the third mode. In this example, the controller 400 is to cause the first and second regulator pumps 27, 28 to be closed when the printing fluid circulation circuit 100 is operating in the first mode.

The example of FIG. 2 may be used to supply printing fluid, via the printing fluid circulation circuit 100, to a plurality of printheads, each printhead comprising first and second fluid ports as follows. In this example, the first circuit port 310 is fluidly connected to a first fluid port of a first printhead (e.g. first fluid port 21 of printhead 20, which may be a first printhead in this example) and a third fluid port of a second printhead; and the second circuit port 320 is fluidly connected to a second fluid port of the first printhead (e.g. second fluid port 22 of first printhead 20) and a fourth fluid port of the second printhead. In this example, therefore, printing fluid circulating toward and through the first circuit port 310 (e.g. when the printing fluid circulation circuit 100 is operating in its first or third mode) will pass through first and third fluid ports, and printing fluid circulating toward and through the second circuit port 320 (e.g. when the printing fluid circulation circuit 100 is operating in its second or third mode) will pass through second and fourth fluid ports. In this example, therefore, printing fluid circulating out of the first and second printheads via the first and third fluid ports (e.g. when the printing fluid circulation circuit 100 is operating in its second mode) will flow back into the system 100 via the first circuit port 310, and printing fluid circulating out of the second and fourth printheads via the first and third fluid ports (e.g. when the printing fluid circulation circuit 100 is operating in its first mode) will flow back into the system 100 via the second circuit port 320. In this example, the controller 40 may be to cause printing fluid recirculation through only one printhead ad a time, e.g. via operation of one or more valves. In this example, each printhead will comprise its own first and second regulators, and by selecting which regulator is open (e.g. by activating the corresponding pump) the printhead through which ink is to be recirculated may be selected.

Therefore, in the first and second modes, the first reservoir 210 may be to create a positive pressure in one of the first and second fluid ports 21, 22, respectively, and the second pump 121 may be to create negative, suction, pressure in the other one of the first and second fluid ports 21, 22.

In some examples, the second pump 121 may be omitted and the suction may be provided by gravity. Hence, printing fluid may, in some examples, be routed from the fourth point 109 to the second reservoir 220 by gravity.

In the third mode, the first reservoir 210 may be refilled, e.g. the first reservoir 210 may be refilled (e.g. from printing fluid from the second reservoir 220 or a third reservoir) during a print job. For example, the controller 400 may be to cause a reservoir (e.g. the second reservoir 220 or a third reservoir) to supply printing fluid to the first reservoir 210 to refill the first reservoir 210 during the third mode of operation of the printing fluid circulation circuit 100, e.g. during a print job. A refill process may, in one example, comprise activating a printing fluid pump (e.g. a printing fluid pump fluidly connected to a reservoir to supply printing fluid to the first reservoir 210).

Pressurised printing fluid in the third mode may therefore be supplied to both of the fluid ports 21 and 22. Therefore, each of the first and second fluid ports 21, 22 of the printhead 20 may be inlets (e.g. pressurised inlets) in the third mode of the printing fluid circulation circuit 100. The first reservoir 210 may therefore be to pressurise the printheads for a printing operation.

Figure 3:
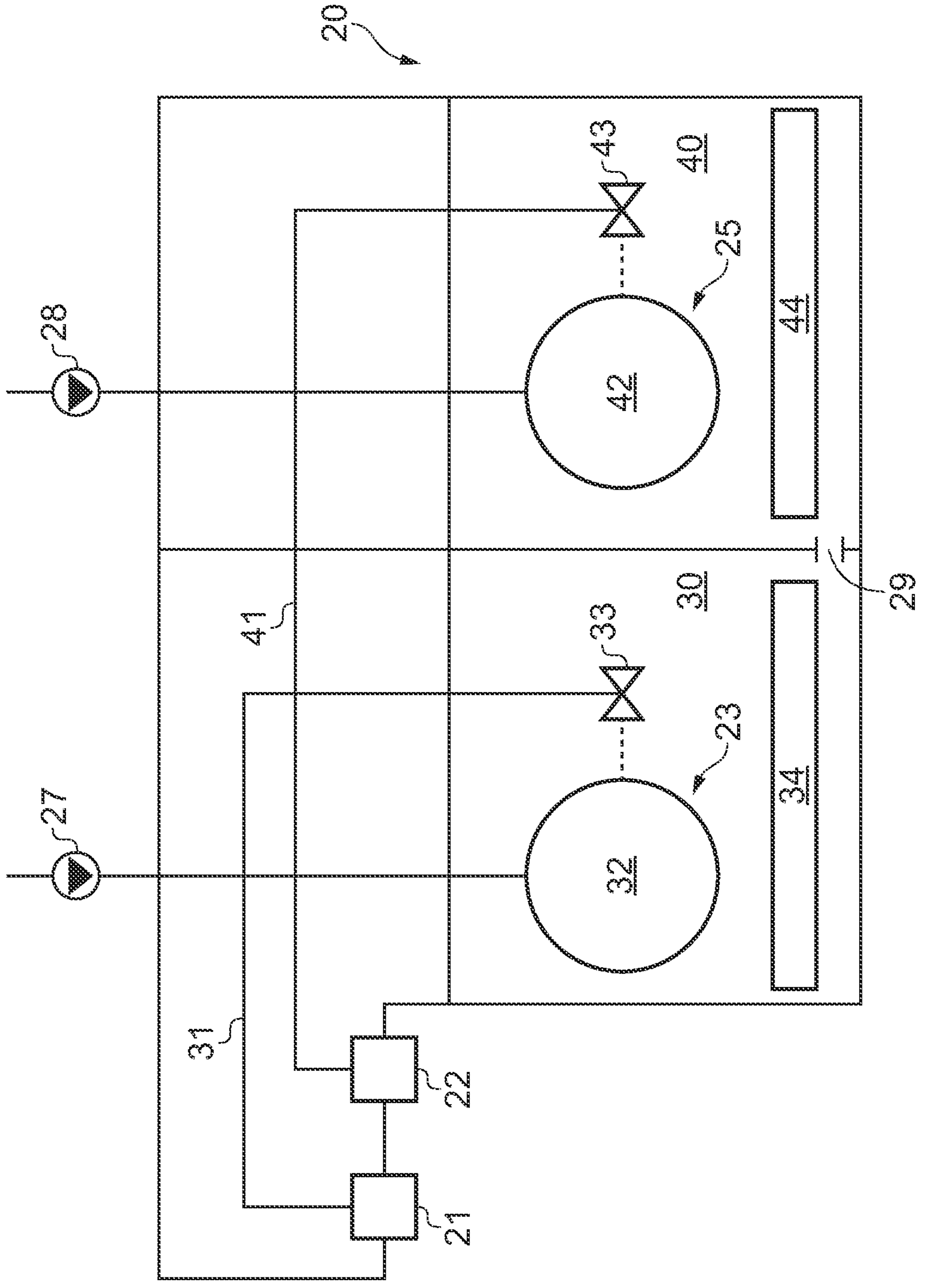
FIG. 3 is a simplified schematic diagram of an example printhead.

FIG. 3 shows an example printhead 20. The example printhead 20 of FIG. 3 may be utilised in the printing system 1 of FIG. 2. In this example, the printhead 20 comprises a first fluid port 21 connected to a first chamber 30 via a first printhead flow path 31, and a second fluid port 22 connected to a second chamber 40 via a second printhead flow path 41. The first regulator 23 comprises a first regulator bag 32 and the second regulator 25 comprises a second regulator bag 42. The first regulator bag 32 is disposed inside the first chamber 30 and the second regulator bag 42 is disposed inside the second chamber 40. A first regulator valve 33 regulates the flow of printing fluid from the first printhead flow path 31 into the first chamber 30, and is operatively connected to the first regulator bag 32 of the first regulator 23. A second regulator valve 43 regulates the flow of printing fluid from the second printhead flow path 41 into the second chamber 40, and is operatively connected to the second regulator bag 42 of the second regulator 25. The first regulator bag 32 may be mechanically connected to the first regulator valve 33. An increase in volume of the first regulator bag 32 may cause the first regulator valve 33 to open. The second regulator bag 42 may be mechanically connected to the second regulator valve 43. An increase in volume of the second regulator bag 42 may cause the first regulator valve 43 to open.

The printhead 20 in this example comprises a first filter 34 disposed in the first chamber 30 and a second filter 44 disposed in the second chamber 40. The printhead 20 in this example comprises a pathway 29 connecting the first and second chambers 30, 40. In one example, each of the first and second filters 34 and 44 are impervious to air. Therefore, each of the first and second filters 34 and 44 may be to prevent air in the printhead and/or in the printing fluid from being communicated to a nozzle of the printhead. In this way, each of the first and second filters 34 and 44 may prevent the quality of a print job from being reduced due to air being in any printing fluid to be deposited onto a substrate. This may, in some examples, however, lead to air becoming trapped in the first and/or second chambers 30, 40. However, some examples herein may enable such air to be removed.

In one example, in use, when the printing fluid circulation circuit 100 is operating in the first mode (supplying printing fluid from the first reservoir to the first circuit port 310 and, therefore, to the first fluid port 21 of the printhead 20 when the first circuit port 310 is fluidly connected to the first fluid port 21), the first reservoir 210 provides a positive fluid pressure to the first circuit port 310 and therefore the first fluid port 21, and the second pump 121 provides a negative, or suction, pressure to the second circuit port 320 and therefore the second fluid port 22. In this example, in the first mode, printing fluid will be caused to flow into the printhead 20 via the first fluid port 21. Printing fluid will flow from the first fluid port 21, which is a printing fluid inlet in the first mode, along the first printhead flow path 31, and thereafter is discharged into the first chamber 30 via the first regulator valve 33. Printing fluid thereafter flows through the first filter 34 and into the second chamber 40, via the passageway 29, and through the second filter 44. Printing fluid thereafter is caused, via the negative, suction, pressure from the second pump 121, to flow through the second printhead flow path 41 and out of the second fluid port 22, which is a printing fluid outlet in the first mode. Thereafter, printing fluid flows from the second fluid port 22 and to the second reservoir 220.

In the first mode, the first chamber 30 in this example will therefore fill with printing fluid, discharged from the first printhead flow path 31. As the first chamber 30 fills with discharged printing fluid, the first regulator bag 32 will expel air to create space in the first chamber 30 for the printing fluid to occupy. Therefore, as the first chamber 30 fills with discharged printing fluid, the first regulator bag 32 will deflate. For example, the first regulator bag 32 may be connected to the atmosphere via the first regulator valve 24 which may be open, to allow air to freely flow in and out of the regulator bag 32, which can therefore expand or contract in response to a presence, or absence, of printing fluid in the first chamber 30. The first regulator bag 32 may therefore be to automatically inflate/deflate depending on the printing fluid level in the first chamber 32. For example, if the printing fluid level decreases then the first regulator bag 32 may automatically inflate and if the printing fluid level increases then the first regulator bag 32 may automatically deflate. Printing fluid, in this example, in the first mode, flows from the first chamber 30 into the second chamber 40 via the passage 29. Printing fluid will be removed from the chamber 40 via the second printhead flow passage 42.

In one example, in use, when the printing fluid circulation circuit 100 is operating in the second mode (supplying printing fluid from the first reservoir to the second circuit port 320 and, therefore, to the second fluid port 22 of the printhead 20 when the second circuit port 320 is fluidly connected to the second fluid port 22), the first reservoir 210 provides a positive fluid pressure to the second circuit port 320 and therefore the second fluid port 22, and the second pump 121 provides a negative, or suction, pressure to the first circuit port 310 and therefore the first fluid port 21. In this example, in the second mode, printing fluid will be caused to flow into the printhead 20 via the second fluid port 22. Printing fluid will flow from the second fluid port 22, which is a printing fluid inlet in the second mode, along the second printhead flow path 41, and thereafter is discharged into the second chamber 40 via the second regulator valve 43. Printing fluid thereafter flows through the second filter 44 and into the first chamber 30, via the passageway 29, and through the first filter 34. Printing fluid thereafter is caused, via the negative, suction, pressure from the second pump 121, to flow through the first printhead flow path 31 and out of the first fluid port 21, which is a printing fluid outlet in the second mode. Thereafter, printing fluid flows from the first fluid port 12 and to the second reservoir 220.

In the second mode, the second chamber 40 in this example will therefore fill with printing fluid, discharged from the second printhead flow path 41. As the second chamber 40 fills with discharged printing fluid, the second regulator bag 42 will expel air to create space in the second chamber 40 for the printing fluid to occupy. Therefore, as the second chamber 40 fills with discharged printing fluid, the second regulator bag 42 will deflate. For example, the second regulator bag 42 may be connected to the atmosphere via the second regulator valve 26 which may be open, to allow air to freely flow in and out of the regulator bag 42, which can therefore expand or contract in response to a presence, or absence, of printing fluid in the second chamber 40. The second regulator bag 42 may therefore be to automatically inflate/deflate depending on the printing fluid level in the second chamber 42. For example, if the printing fluid level decreases then the second regulator bag 42 may automatically inflate and if the printing fluid level increases then the second regulator bag 42 may automatically deflate. Printing fluid, in this example, in the second mode, flows from the second chamber 40 into the first chamber 30 via the passage 29. Printing fluid will be removed from the first chamber 30 via the first printhead flow passage 31.

Therefore, when the printing fluid circulation circuit 100 is to operate in the first mode, a positive pressure is supplied to the first supply port 310 and therefore to the first fluid port 21. The controller 400 may be to cause the second regulator 25 to open. For example, the controller 400 may be to cause the second regulator bag 42 to open. The second regulator 25 may be opened by causing the second regulator valve 26 (which may be normally open so that the second regulator bag 42 is fluidly connected to the atmosphere) to be closed and by causing the second regulator pump 28 to blow air into the second regulator bag 42. The controller 400 may therefore be to cause the second regulator valve 26 to close and to cause the second regulator pump 28 to blow air into the second regulator bag 42 when the printing fluid circulation circuit 100 is to operate in its first mode. Opening the second regulator 25 will, in this example, cause the second fluid port 22 to be opened and to be an outlet, thereby facilitating, in this example, the second fluid port 22 to be exposed to the negative, suction, pressure from the second pump 121 to enable fluid circulation therethrough. When the printing fluid circulation circuit 100 is to operate in the second mode, a positive pressure is supplied to the second supply port 320 and therefore to the second fluid port 22. The controller 400 may be to cause the first regulator 23 to open. For example, the controller 400 may be to cause the first regulator bag 32 to open. The first regulator 23 may be opened by causing the first regulator valve 24 (which may be normally open so that the first regulator bag 32 is fluidly connected to the atmosphere) to be closed and by causing the first regulator pump 27 to blow air into the first regulator bag 32. The controller 400 may therefore be to cause the first regulator valve 24 to close and to cause the first regulator pump 27 to blow air into the first regulator bag 32 when the printing fluid circulation circuit 100 is to operate in its second mode. Opening the first regulator 23 will, in this example, cause the first fluid port 21 to be opened and to be an outlet, thereby facilitating, in this example, the first fluid port 21 to be exposed to the negative, suction, pressure from the second pump 121 to enable fluid circulation therethrough. Therefore, any air trapped in either one of the first or second chamber 30, 40 may be removed. For example, air trapped in the first chamber 30, when the printing fluid circulation circuit is operating in the second mode, may be sucked, via the negative pressure from the first pump 121, through the first printhead flow path 31 and pumped, via the first pump 121, to the second reservoir. Alternatively, air trapped in the second chamber 40, when the printing fluid circulation circuit is operating in the first mode, may be sucked, via the negative pressure from the first pump 121, through the second printhead flow path 41 and pumped, via the first pump 121, to the second reservoir. Therefore, by recirculating printhead fluid in each direction, e.g. changing the direction of recirculation by switching between the first and second modes, trapped air may be routed into the ink delivery system of the printing system, and routed into the second reservoir 220. The second reservoir 220 may be comprised in an ink cartridge and therefore by replacing the ink cartridge the air may be conveniently removed from the printing system 1.

Figure 4:
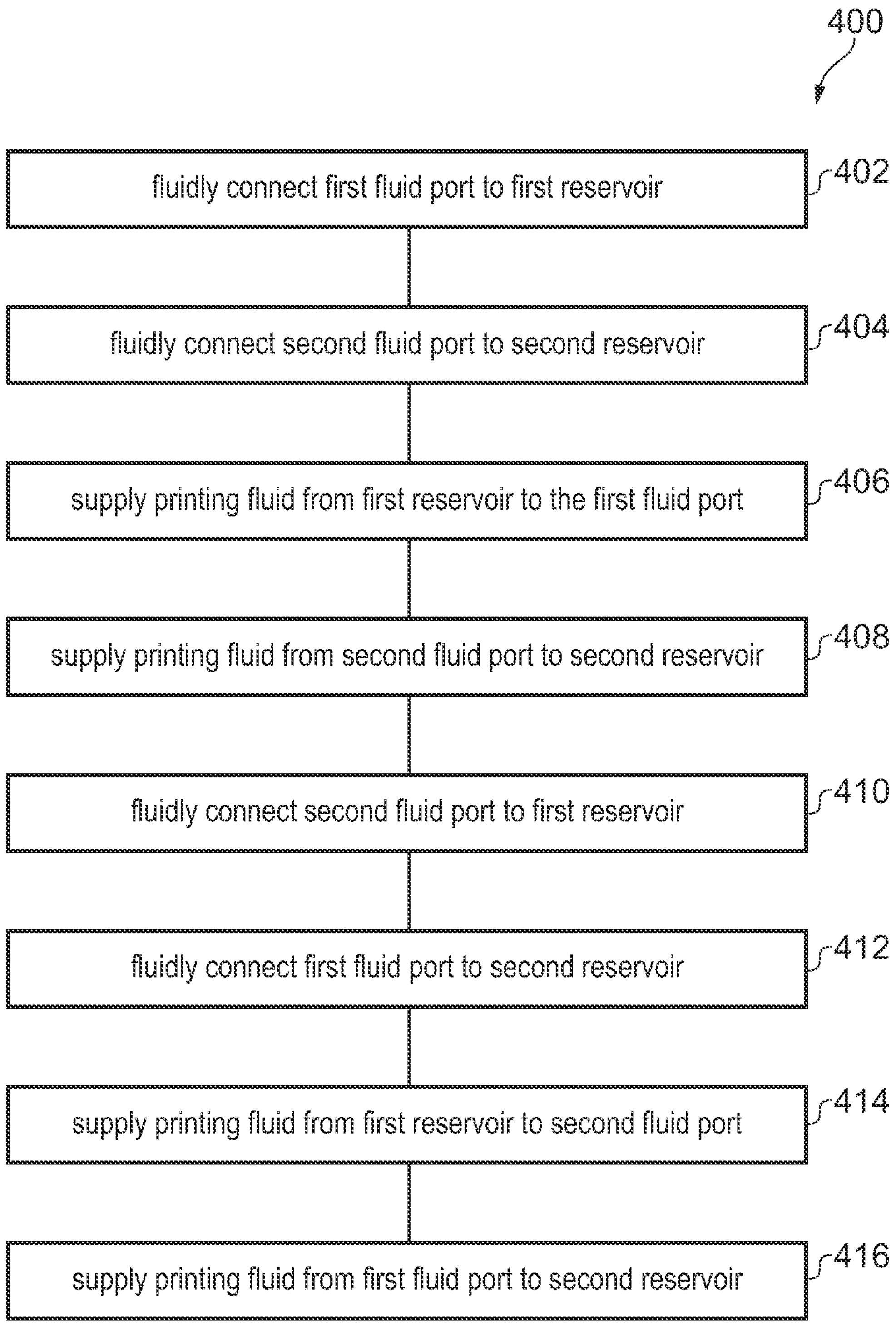
FIG. 4 is a flow diagram of an example method.

FIG. 4 shows an example method 400 of operating a printing system, the printing system comprising a first reservoir to store printing fluid, a second reservoir to store printing fluid, a printhead having a first fluid port and a second fluid port, and a printing fluid circulation circuit to supply printing fluid from the first reservoir to either one of the first and second fluid ports of the printhead.

The method 400 comprises, at block 402, fluidly connecting the first fluid port to the first reservoir. At block 404, the method 400 comprises fluidly connecting the second fluid port to the second reservoir.

The method comprises, at block 406, supplying printing fluid from the first reservoir to the first fluid port. At block 408, the method 400 comprises supplying printing fluid from the second fluid port to the second reservoir.

The method 400 comprises, at block 410, fluidly connecting the second fluid port to the first reservoir. At block 412, the method 400 comprises fluidly connecting the first fluid port to the second reservoir.

The method comprises, at block 414, supplying printing fluid from the first reservoir to the second fluid port. At block 416, the method 400 comprises supplying printing fluid from the first fluid port to the second reservoir.

The printing fluid circulation system 10, or the printing system 1 of the examples of FIGS. 1 and 2, respectively, may be to perform the method 400 of FIG. 4. In this example, blocks 402-408 represent the printing fluid circulation circuit 100 operating in the first mode, and blocks 410-416 represent the printing fluid circulation circuit 100 operating in the second mode. Also in this example, block 402 may comprise opening the first valve 111, block 404 may comprise opening the second valve 112, and one of blocks 402 and 404 may comprise closing the third and fourth valves 113, 114. Also in this example, block 410 may comprise opening the third valve 113, and block 412 may comprise opening the fourth valve 114, and one of the blocks 410, 412 may comprise closing the first and second valves 112, 113.

The method 400, in one example, may be performed after it has been determined, e.g. by the controller 400, that the printing system 1 has been in an idle state for more than a predetermined period of time. In this example, the printing system 1 may be considered to be in an idle state when the printing system 1 is not performing a print job (e.g. applying printing fluid to a substrate and/or when printing fluid is not being circulated). The predetermined period of time may, for example, be ten minutes, twenty minutes, thirty minutes, an hour, two hours, three hours, or four hours. In some examples, the predetermined period of time may be a period of time other than the examples listed. When the printing system 1 is in an idle state, the printing fluid may not be in motion.

Figure 5:
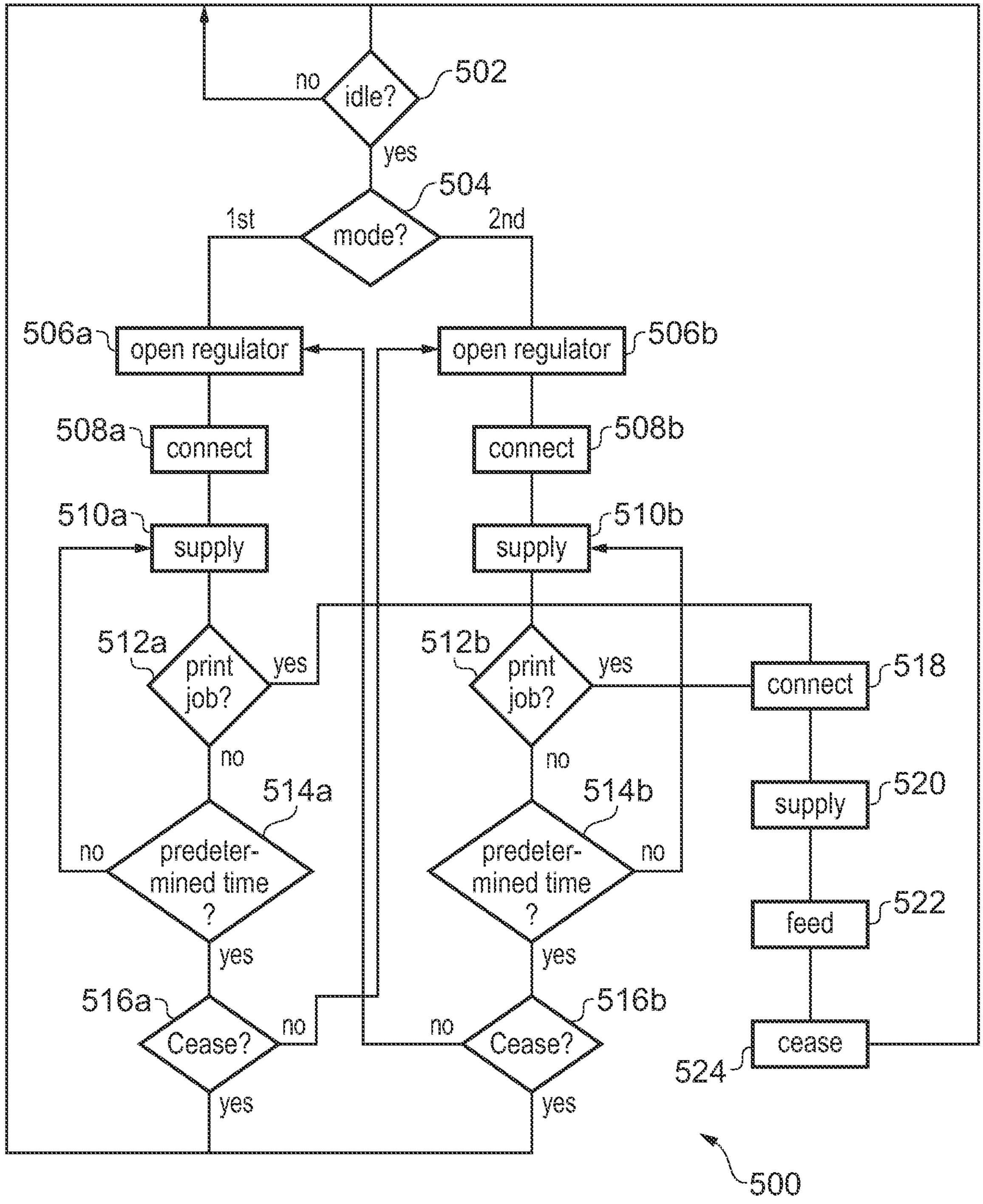
FIG. 5 is a flow diagram of an example method.

On example method will now be described with reference to the example depicted in FIG. 5. FIG. 5 shows an example method 500. The method 500 may be a method of operating a printing system comprising a printing fluid circulation system comprising a first reservoir to store printing fluid, a second reservoir to store printing fluid, a first circuit port to supply printing fluid to, or receive printing fluid from, a first fluid port of a printhead, a second circuit port to supply printing fluid to, or receive printing fluid from, a second fluid port of a printhead, and a printing fluid circulation circuit to operate in a first mode to concurrently supply printing fluid from the first reservoir to the first circuit port and from the second circuit port to a second reservoir, and in a second mode to concurrently supply printing fluid from the first reservoir to the second circuit port and from the first circuit port to the second reservoir.

The printing fluid circulation circuit 100 or the printing system 1 of the examples of FIGS. 1 and 2, respectively, may be to perform the method 500 of FIG. 5.

In one example, the method 500 may be a method of operating the printing system 1 of the example of FIG. 2.

The method 500 comprises, in block 502, determining if the printing system (e.g. the printing system 1) has been in an idle state for more than a predetermined period of time. In this example, the printing system 1 may be considered to be in an idle state when the printing system 1 is not performing a print job (e.g. applying printing fluid to a substrate and/or when printing fluid is not being circulated). The predetermined period of time may, for example, be ten minutes, twenty minutes, thirty minutes, an hour, two hours, three hours, or four hours. In some examples, the predetermined period of time may be a period of time other than the examples listed. When the printing system 1 is in an idle state, the printing fluid may not be in motion.

In this example, if it is determined at block 502 that the printing system has not been in an idle state for more than a predetermined period of time then the method returns to block 502. If, in this example, it is determined at block 502 that the printing system has been in an idle state for more than a predetermined period of time then it may be determined that circulation of printing fluid is to be performed and, accordingly, the method proceeds to block 504.

In some example, block 502 of the method 500 may be omitted. In some examples, the method 500 may be performed for some or all of the time that the printing system is not performing a print job. In some examples, the method 500 may be performed periodically when the printing system is not performing a print job, such as every X minutes, with X being, for example, ten, thirty sixty, one hundred and twenty, one hundred and eighty, two hundred and forty minutes, etc.

The method 500 comprises, at block 504, determining which of the first and second modes the printing fluid circulation circuit (e.g. the printing fluid circulation circuit 100 of the example of FIG. 2) is to operate in.

It, at block 504, it is determined that the printing fluid circulation circuit is to operate in the first mode then the method 500 advances to block 506*a*. It, at block 504, it is determined that the printing fluid circulation circuit is to operate in the second mode then the method 500 advances to block 506*b*.

At block 506*a*, the method comprises opening the second regulator 25. The second regulator bag 42 may be ordinarily fluidly connected to the atmosphere, e.g. via second regulator valve 26 being in an open state, so as to be at atmospheric pressure. Block 506*a* may comprise closing the second regulator valve 26 and activating the second regulator pump 28 to blow air into the second regulator bag 42 of the second regulator 25. Opening the second regulator 25, in this example, causes the second circuit port 320 to be open. Therefore, block 506*a* may comprise configuring the printing fluid circulation circuit 100 such that the second circuit port 320 is an outlet.

At block 506*b*, the method comprises opening the first regulator 23. The first regulator bag 32 may be ordinarily fluidly connected to the atmosphere, e.g. via first regulator valve 24 being in an open state, so as to be at atmospheric pressure. Block 506*b* may comprise closing the first regulator valve 24 and activating the first regulator pump 27 to blow air into the first regulator bag 32 of the first regulator 23. Opening the first regulator 23, in this example, causes the first circuit port 310 to be open. Therefore, block 506*b* may comprise configuring the printing fluid circulation circuit 100 such that the first circuit port 310 is an outlet.

At block 508*a*, the method 500 comprises fluidly connecting the first reservoir 210 to the first circuit port 310 and fluidly connecting the second circuit port 320 to the second reservoir 220. Block 508*a* may comprise opening the first and second valves 111, 112 and closing third and fourth valves 113, 114, e.g. under the control of the controller 400. In one example, the valves 111-114 may already be suitable set so that these fluid connections are already present. In some examples, blocks 506*a* and 508*a* may be performed simultaneously.

At block 508*b*, the method 500 comprises fluidly connecting the first reservoir 210 to the second circuit port 320 and fluidly connecting the first circuit port 310 to the second reservoir 220. Block 508*b* may comprise opening the third and fourth valves 113, 114 and closing first and second valves 111, 112, e.g. under the control of the controller 400. In one example, the valves 111-114 may already be suitable set so that these fluid connections are already present. In some examples, blocks 506*b* and 508*b* may be performed simultaneously.

At block 510*a*, the method 500 comprises supplying printing fluid from the first reservoir 210 to the first circuit port 310 and supplying printing fluid from the second circuit port 320 to the second reservoir 220.

Block 510*a* may comprise operating the second pump 121. Block 510*a* may comprise operating the second pump 121 for a predetermined period of time. In another example, operating the second pump 121, e.g. for a predetermined period of time, may be performed simultaneously with any of blocks 502, 504*a*, 506*a*, or 508*a*. Operating the second pump 121 may supply a negative pressure to second circuit port 320 to draw printing fluid from the second circuit port 320 and to pump printing fluid to the second reservoir 220. Operating the second pump 121 may be done under control of the controller 400. Block 510*a* may also comprise operating the first pump 213 so as to pressurise printing fluid in the first reservoir 210. In one example, operating the first pump 213 so as to pressurise printing fluid in the first reservoir 210 may be performed simultaneously with any of blocks 502, 504*a*, 506*a*, or 508*a*.

Block 510*a* may comprise supplying printing fluid from the first reservoir 210 to the first circuit port 310 by supplying printing fluid from the first reservoir 210 to the first flow path 101, and supplying printing fluid from the second circuit port 320 to the second reservoir 220 by supplying printing fluid from the second system 320 to the second flow path 102.

Block 510*a* may therefore comprise circulating printing fluid to a printhead (e.g. printhead 20). Block 510*a* may therefore comprise circulating printing fluid into and through printhead 20 via first fluid port 21 and out of the printhead 20 via second fluid port 22. Block 510*a* may therefore comprise circulating printing fluid into the printhead 20 via the first fluid port 21 which is an inlet in this example, into the first chamber 30 via the first printhead flow path 31, through the first filter 34, into and through the passage 29 and therefore into the second chamber 40 via the passage 29, through the second filter 44, and into the second chamber 40, then into the second printhead flow path 41 where printing fluid then exits the printhead 20 via the second fluid port 22 which is an outlet in this example.

At block 510*b*, the method 500 comprises supplying printing fluid from the first reservoir 210 to the second circuit port 320 and supplying printing fluid from the first circuit port 120 to the second reservoir 220.

Block 510*b* may comprise operating the second pump 121. Block 510*a* may comprise operating the second pump 121 for a predetermined period of time. In another example, operating the second pump 121, e.g. for a predetermined period of time, may be performed simultaneously with any of blocks 502, 504*b*, 506*b*, or 508*b*. Operating the second pump 121 may supply a negative pressure to first circuit port 310 to draw printing fluid from the first circuit port 310 and to pump printing fluid to the second reservoir 220. Operating the second pump 121 may be done under control of the controller 400. Block 510*b* may also comprise operating the first pump 213 so as to pressurise printing fluid in the first reservoir 210. In one example, operating the first pump 213 so as to pressurise printing fluid in the first reservoir 210 may be performed simultaneously with any of blocks 502, 504*a*, 506*a*, or 508*a*.

Block 510*b* may comprise supplying printing fluid from the first reservoir 210 to the second circuit port 310 by supplying printing fluid from the first reservoir 210 to the first sub-path 101*a*, third flow path 103, and fourth sub-path 102*a*, and supplying printing fluid from the first circuit port 310 to the second reservoir 220 by supplying printing fluid from the second system 310 to the third sub-path 101*c*, the fourth flow path 104, and sixth sub-path 102*c*.

Block 510*b* may therefore comprise circulating printing fluid to a printhead (e.g. printhead 20). Block 510*b* may therefore comprise circulating printing fluid into and through printhead 20 via the second fluid port 22 and out of the printhead 20 via the first fluid port 21. Block 510*b* may therefore comprise circulating printing fluid into the printhead 20 via the second fluid port 22 which is an inlet in this example, into the second chamber 40 via the second printhead flow path 41, through the second filter 44, into and through the passage 29 and therefore into the first chamber 30 via the passage 29, through the first filter 34, and into the first chamber 30, then into the first printhead flow path 31 where printing fluid then exits the printhead 20 via the first fluid port 21 which is an outlet in this example.

At blocks 512*a* and 512*b* it is determined, e.g. by controller 400, whether a print job on a substrate is to be performed. If it is determined at either one of blocks 512*a*, 512*b*, that a print job is not to be performed then the method 500 advances, respectively, to blocks 514*a*, and 514*b*, at which it is determined if a predetermined time has elapsed during which the printing system 1 has been circulating fluid in the first mode (block 514*a*) or the second mode (514*b*). If at blocks 514*a*, 514*b*, it is determined that the elapsed time in which the printing system has been circulating fluid in either of the first or second modes has not exceeded the predetermined time then the method 500 returns to blocks 510*a*, or 510*b*, respectively, so that printing fluid may continue to be supplied according to whichever one of the first and second modes the system has previously been operating in. In some examples the predetermined time may be any one of 5 minutes, 10 minutes, 15 minutes, 20 minutes, 30 minutes, 1 hours, 2 hours. In some examples, the predetermined tie may be other than the examples listed.

However, if, at either one of blocks 514*a* or 514*b*, it is determined that a predetermined time has elapsed then the method 500 advances to blocks 516*a* and 516*b*, respectively, at which it is determined if printing fluid recirculation should cease. For example, printing fluid recirculation through the printhead, according to the first or second mode, may be activated for a specific amount of time (e.g. a predetermined amount of time). This may, in some examples, depend on the ink properties and printhead geometry. In one example, block 504 may comprise determining whether the printing fluid circulation circuit is to operate in its first, or second, mode for a predetermined amount of time. In this example, method blocks 506*a*-510*a* (if in the first mode) or 506*b*-510*b* (if in the second mode) may be performed for the predetermined amount of time. In one example, the duration of the first and/or second mode may be approximately 70 seconds.

Blocks 506*a*-510*a* (or blocks 506*b*-510*b*) may be performed for a predetermined number of times before the method 500, at block 516*a* or 516*b*, determines that printing fluid recirculation according to the first or second mode should cease. For example, the method 500 may cause the printing fluid circulation circuit to operate in its first and second mode twice each before ceasing (at block 516*a* or 516*b*) the printing fluid recirculation operation.

That is, at block 514*a* or 514*b*, after activating the second pump 121 and actuating the valves 111-114 and 24, 26, the pump operation and valve configuration may be kept for the predetermined amount of time (e.g. 70 seconds) to allow continuous flow through the printhead for this amount of time. After this time has elapsed, the operation of the second pump 121 may cease and the valve configuration may be changed, e.g. under control of the controller 400. If at block 516*a* or 516*b* it is determined that printing fluid recirculation should cease, then the method 500 returns to block 502.

If, at block 516*a*, it is determined that printing fluid recirculation should not cease, having been determined at block 514*a* that the predetermined time has elapsed, then the method 500 advances to block 506*b*. In other words, if the printing fluid circulation circuit is operating in its first mode for a predetermined amount of time and that printing fluid recirculation should not cease, then the method 500 causes the printing fluid circulation circuit to operate in its second mode. On the other hand, if, at block 516*b*, it is determined that printing fluid recirculation should not cease, having been determined at block 514*b* that the predetermined time has elapsed, then the method 500 advances to block 506*a*. In other words, if the printing fluid circulation circuit is operating in its second mode for a predetermined amount of time and that printing fluid recirculation should not cease, then the method 500 causes the printing fluid circulation circuit to operate in its first mode. Therefore, at blocks 516*a* or 516*b* it may be determined whether the printing fluid circulation circuit is to switch its mode of operation. For example, the configuration of the valves 111-114, 25 and 26, e.g. under the control of the controller 400, may be altered to cause the printing fluid circulation circuit to operate in the other of the two modes. In one example, each of the first and second modes may be performed for a predetermined period of time (e.g. 70 seconds), after which the printing fluid circulation circuit may operate in the other of the two modes. In one example, each mode may be performed a predetermined number of times (e.g. once, twice, three times) before printing fluid recirculation may cease and, at blocks 516*a* and 516*b* the method may return to block 502.

If, at either one of blocks 512*a* or 512*b* it is determined that a print job is to be performed then the method 500 advances to block 518. At block 518, the method 500 comprises fluidly connecting the first reservoir 210 with both of the first circuit port 310 and the second circuit port 320. Block 518 may therefore comprise causing, e.g. via the controller 400, the first and third valves 111, 113 to be open and the second and fourth valves 112, 114 to be closed. In one example, the valves 111-114 may already be suitable set so that these fluid connections are already present. At block 520 the method 500 comprises supplying printing fluid from the first reservoir 210 to the first and second circuit ports 310, 320. Block 520 may therefore comprise supplying printing fluid from the first reservoir 210 to the first path 101, and to the first sub-path 101*a*, third flow path 103, and fourth sub-path 102. The first and second circuit ports 310, 320, in this example, are fluidly connected to the first and second fluid ports 21, 22, respectively, of the printhead 20. Therefore, block 520, in this example, comprises supplying printing fluid into the printhead 20 via the first and second fluid ports 21, 22 which are both inlets in this example. Block 520 may therefore comprise supplying printing fluid from the first reservoir 210 to a printhead.

Either one of blocks 518 and 520 may comprise deactivating, or switching off, the second pump 121 so that a negative, or suction, pressure is not supplied to the printhead 20. Either one of blocks 518 and 520 may comprise activating, or switching on, the first pump 213 so as to pressurise printing fluid in the first reservoir 210.

In this example, at block 522, the method 500 comprises feeding printing fluid, having been supplied to the printhead at block 520, to a nozzle of a printhead to apply printing fluid to a substrate during the print job. For example, first fluid port 21 may feed printing fluid to a first nozzle and second fluid port 22 may feed printing fluid to a second nozzle, and each nozzle may apply printing fluid to a substrate during the print job.

When the print job is completed at block 524 the method 500 comprises ceasing supplying printing fluid to the first and second circuit ports 310, 320 (e.g. under the control of the controller 400) and the method 500 returns to block 502.

The method 500 may comprise refilling the first reservoir 210, e.g. from printing fluid from the second reservoir 220 or another reservoir.

Figure 6:
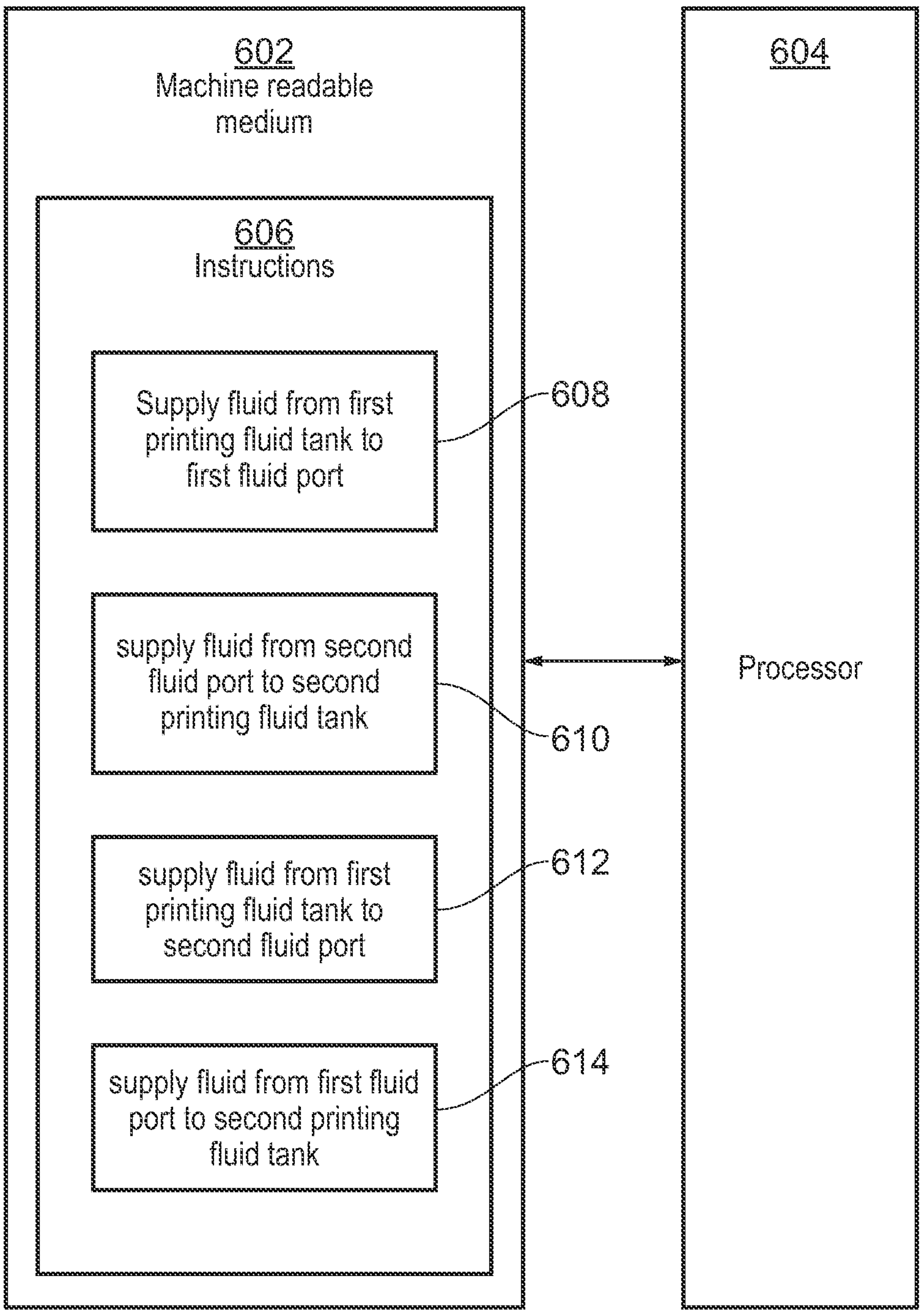
FIG. 6 is an example of a machine-readable medium in association with a processor.

FIG. 6 is an example of a tangible (and non-transitory) machine readable medium 602 in association with a processor 604 of a printing system. The tangible machine readable medium 602 comprises instructions 606 which, when executed by the processor 604, cause the processor 604 of the printing system to carry out a plurality of tasks. The instructions 606 comprise instructions 608 to cause the processor 604 to cause a printing fluid circulation circuit of the printing system to supply printing fluid from a first printing fluid tank to a first fluid port of a printhead. The instructions 606 comprise instructions 610 to cause the processor 604 to cause the printing fluid circulation circuit of the printing system to supply printing fluid from a second fluid port of the printhead to a second printing fluid tank. The instructions 606 comprise instructions 612 to cause the processor 604 to cause the printing fluid circulation circuit of the printing system to supply printing fluid from the first printing fluid tank to the second fluid port of the printhead. The instructions 606 comprise instructions 614 to cause the processor 604 to cause the printing fluid circulation circuit of the printing system to supply printing fluid from the first printing fluid port of the printhead to the second printing fluid tank.

In one example, the instructions 606 comprise instructions to cause the printing fluid circulation circuit of the printing system to supply printing fluid from the first printing fluid tank to the first and the second fluid port of the printhead.

In one example, the instructions 606 comprise instructions to cause a first printhead regulator of the printhead to open.

In one example, the instructions 606 comprise instructions to cause a second printhead regulator of the printhead to open.

In one example, the instructions 606 comprise instructions to cause the processor to perform any, or a combination, of the blocks of the example methods 400 and 500 as set out in FIGS. 4 and 5, respectively; or to provide the controller 400 of the example of FIG. 2.

Some examples herein may enable air trapped in a printhead to be removed, e.g. recirculated through the printhead and routed into an ink delivery system and to a reservoir. Some examples herein utilise a change in printhead fluid recirculation to enable air trapped in both chambers of a two-chambered printhead to be removed from a printing system. Printing fluid may be recirculated at any frequency. Some examples herein may mean that the reliability of a printhead may not be compromised, as it may not matter how many litres of printhead fluid pass through the printhead filters since the recirculation can happen in two directions, and therefore any air that may be trapped may be removed in the following cycle (e.g. when a recirculation operation is subsequently run). Therefore, some examples herein may enable air trapped in the ink delivery system of a printing system to be removed periodically without intervention. For example, trapped air may be circulated to a reservoir in a cartridge which, when empty, a user may replace for a new one and hence remove the air while doing so. Additionally, some examples herein may mean that extra air-removing hardware is not required in the printing system (such as a degasification unit). Example printing systems herein may therefore have greater robustness, such ink sensors (such as flowmeters and pressure sensors) rely on having the system without air that could otherwise affect the sensor's readings.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A system, comprising:

a first set of flow paths including a pump to circulate a printing fluid through a printhead in a first direction; and a second set of flow paths including the pump to circulate the printing fluid through the printhead in a second direction opposite to the first direction, wherein the first set of flow paths is activated during a first mode to circulate the printing fluid from a first reservoir to a second reservoir and wherein the second set of flow paths is activated during a second mode different from the first mode to circulate the printing fluid from the first reservoir to the second reservoir, wherein the pump is coupled between the second reservoir and the printhead and is the only pump included in the first and second sets of flow paths.

2. The system of claim 1, wherein:

the first set of flow paths includes a first flow path between the first reservoir and a first port of a printhead and a second flow path between a second port of the printhead and the second reservoir; and the second set of flow paths includes a third flow path between the first reservoir the second port of the printhead and a fourth flow path between the first port of the printhead and the second reservoir, wherein the printing fluid flows through a same port of the second reservoir in both the first and second sets of flow paths.

3. The system of claim 2, wherein:

the first flow path and the second flow path are to circulate the printing fluid from the first reservoir to the second reservoir in the first mode; and the third flow path and the fourth flow path are to circulate the printing fluid from the first reservoir to the second reservoir in the second mode.

4. The system of claim 2, wherein:

the first set of flow paths is coupled to a fluid port of the first reservoir;

the second set of flow paths is coupled to a fluid port of the second reservoir;

the first fluid port is a one-directional port which is to output printing fluid in the first direction; and the second fluid port is a one-directional port which is to receive printing fluid flowing in the second direction.

5. The system of claim 1, wherein the first set of flow paths or the second set of flow paths is activated after a predetermined period of time has elapsed.

6. The system of claim 5, wherein the predetermined period of time includes an idle period.

7. The system of claim 6, wherein no print job is performed by the printhead during the idle period.

8. The method of claim 6, wherein the predetermined period of time includes a period where no print job is performed by the printhead.

9. A system, comprising:

a first set of flow paths to circulate a printing fluid through a printhead in a first direction; and a second set of flow paths to circulate the printing fluid through the printhead in a second direction opposite to the first direction, wherein the first set of flow paths is activated during a first mode to circulate the printing fluid from a first reservoir to a second reservoir and wherein the second set of flow paths is activated during a second mode different from the first mode to circulate the printing fluid from the first reservoir to the second reservoir, wherein:

the first set of flow paths includes a first flow path between the first reservoir and a first port of a printhead and a second flow path between a second port of the printhead and the second reservoir; and the second set of flow paths includes a third flow path between the first reservoir the second port of the printhead and a fourth flow path between the first port of the printhead and the second reservoir, and the first flow path and the third flow path are to concurrently circulate the printing fluid from the first reservoir to the first port and the second port, respectively, in a third mode.

10. The system of claim 9, wherein the third mode is a printing mode.

11. A method, comprising:

circulating a printing fluid through a printhead in a first direction using a pump in a first mode; and circulating the printing fluid through the printhead in a second direction opposite to the first direction using the pump in a second mode, wherein the printing fluid is circulated from a first reservoir to a second reservoir through a first set of flow paths in the first mode and wherein the printing fluid is circulated from the first reservoir to the second reservoir through a second set of flow paths in the second mode, wherein the pump is coupled between the second reservoir and the printhead and is the only pump included in the first and second sets of flow paths.

12. The method of claim 11, wherein:

the printing fluid is circulated in the first direction through the first set of flow paths coupled to the printhead, the first set of flow paths circuit including a first flow path between the first reservoir and a first port of a printhead and a second flow path between a second port of the printhead and the second reservoir; and the printing fluid is circulated in the second direction through the second circuit set of flow paths coupled to the printhead, the second set of flow paths circuit including a third flow path between the first reservoir the second port of the printhead and a fourth flow path between the first port of the printhead and the second reservoir, wherein the printing fluid flows through a same port of the second reservoir in both the first set of flow paths and the second set of flow paths.

13. The method of claim 12, wherein:

the first flow path and the second flow path are to circulate a printing fluid from the first reservoir to the second reservoir in the first mode; and the third flow path and the fourth flow path are to circulate the printing fluid from the first reservoir to the second reservoir in the second mode.

14. The method of claim 12, wherein:

the first set of flow paths is coupled to a fluid port of the first reservoir;

the second set of flow paths is coupled to a fluid port of the second reservoir;

the first fluid port is a one-directional port which outputs printing fluid flowing in the first direction; and the second fluid port is a one-directional port which receives printing fluid flowing in the second direction.

15. The method of claim 11, wherein circulating the printing fluid in one of the first direction or the second direction is performed after a predetermined period of time has elapsed.

16. A method, comprising:

circulating a printing fluid through a printhead in a first direction in a first mode; and circulating the printing fluid through the printhead in a second direction opposite to the first direction in a second mode, wherein the printing fluid is circulated from a first reservoir to a second reservoir in the first mode and wherein the printing fluid is circulated from the first reservoir to the second reservoir in the second mode, wherein:

the printing fluid is circulated in the first direction through a first set of flow paths coupled to the printhead, the first set of flow paths including a first flow path between the first reservoir and a first port of a printhead and a second flow path between a second port of the printhead and the second reservoir, the printing fluid is circulated in the second direction through a second set of flow paths coupled to the printhead, the second set of flow paths including a third flow path between the first reservoir the second port of the printhead and a fourth flow path between the first port of the printhead and the second reservoir, and the first flow path and the third flow path concurrently circulate the printing fluid from the first reservoir to the first port and the second port, respectively, in a third mode.

17. The method of claim 16, wherein the third mode is a printing mode.

18. A non-transitory computer-readable medium storing instructions which, when executed, by one or more processors cause the one or more processors to:

control circulation of a printing fluid through a printhead in a first direction using a pump in a first mode; and control circulation of the printing fluid through the printhead in a second direction opposite to the first direction using the pump in a second mode, wherein the printing fluid is circulated from a first reservoir to a second reservoir through a first set of flow paths in the first mode and wherein the printing fluid is circulated from the first reservoir to the second reservoir through a second set of flow paths in the second mode, wherein the pump is coupled between the second reservoir and the printhead and is the only pump included in the first and second sets of flow paths.

19. The non-transitory computer-readable medium of claim 18, wherein the instructions cause the one or more processors to:

control circulation of the printing fluid in the first direction through the first set of flow paths coupled to the printhead, the first set of flow paths including a first flow path between the first reservoir and a first port of a printhead and a second flow path between a second port of the printhead and the second reservoir; and control circulation of the printing fluid in the second direction through the second set of flow paths coupled to the printhead, the second set of flow paths including a third flow path between the first reservoir the second port of the printhead and a fourth flow path between the first port of the printhead and the second reservoir, wherein the printing fluid flows through a same port of the second reservoir in both the first set of flow paths and the second set of flow paths.

20. The non-transitory computer-readable medium of claim 19, wherein:

the first flow path and the second flow path are to circulate a printing fluid from the first reservoir to the second reservoir in the first mode; and the third flow path and the fourth flow path are to circulate the printing fluid from the first reservoir to the second reservoir in the second mode.

* * * * *